US008803862B2

(12) United States Patent
Lee

(10) Patent No.: US 8,803,862 B2
(45) Date of Patent: Aug. 12, 2014

(54) GAMMA RESISTOR SHARING FOR VCOM GENERATION

(75) Inventor: Yongman Lee, Pleasanton, CA (US)

(73) Assignee: Apple Inc., Cupertino, CA (US)

( * ) Notice: Subject to any disclaimer, the term of this patent is extended or adjusted under 35 U.S.C. 154(b) by 956 days.

(21) Appl. No.: 12/839,126

(22) Filed: Jul. 19, 2010

(65) Prior Publication Data

US 2011/0227891 A1 Sep. 22, 2011

Related U.S. Application Data

(60) Provisional application No. 61/316,204, filed on Mar. 22, 2010.

(51) Int. Cl.

| | |
|---|---|
| ***G06F 3/038*** | (2013.01) |
| ***H01C 10/16*** | (2006.01) |
| ***H01C 10/00*** | (2006.01) |
| ***H01C 7/22*** | (2006.01) |
| ***H01C 1/01*** | (2006.01) |
| ***G09G 3/36*** | (2006.01) |
| ***G09G 5/10*** | (2006.01) |

(52) U.S. Cl.

USPC ............... 345/211; 338/48; 338/72; 338/295; 338/320; 345/89; 345/690

(58) Field of Classification Search

None

See application file for complete search history.

(56) References Cited

U.S. PATENT DOCUMENTS

| | | | | |
|---|---|---|---|---|
| 7,173,597 | B2 | 2/2007 | Kato | |
| 2002/0126112 | A1* | 9/2002 | Kato | 345/204 |
| 2005/0206602 | A1* | 9/2005 | Kojima | 345/96 |
| 2006/0238473 | A1* | 10/2006 | Hashimoto | 345/89 |
| 2007/0290980 | A1 | 12/2007 | Lin et al. | |
| 2008/0174578 | A1 | 7/2008 | Tung et al. | |
| 2009/0040244 | A1* | 2/2009 | Lee et al. | 345/690 |
| 2009/0079715 | A1 | 3/2009 | Kim | |
| 2009/0135116 | A1 | 5/2009 | Chang | |
| 2009/0219307 | A1* | 9/2009 | Yaguma et al. | 345/690 |
| 2010/0001973 | A1* | 1/2010 | Hotelling et al. | 345/174 |

FOREIGN PATENT DOCUMENTS

| | | | |
|---|---|---|---|
| EP | 2141573 | A2 | 1/2010 |
| TW | 200802247 | A | 1/2008 |

OTHER PUBLICATIONS

U.S. Appl. No. 61/316,210, filed Mar. 22, 2010, Lee.
International Search Report for PCT Application No. PCT/US2011/026493 dated May 10, 2011, 13 pgs.
Taiwanese Office Action for Taiwanese Application No. 100108603 dated Sep. 27, 2013; 5 pgs.

* cited by examiner

*Primary Examiner* — Alexander S Beck
*Assistant Examiner* — Kirk Hermann
(74) *Attorney, Agent, or Firm* — Fletcher Yoder PC

(57) ABSTRACT

A display device having a data voltage generation circuit and a common voltage generation circuit that are both coupled to a common reference voltage is provided. By utilizing a common ground, variations between the data signals relative to the common voltage may be reduced, thereby improving voltage precision and color accuracy. In one embodiment, the data voltage generation circuit may be a gamma adjustment circuit that utilizes a resistor string having a center grounding point. The common voltage generation circuit may share the resistor string and the grounding point with the gamma adjustment circuit. Thus, data voltage signals and common voltage signals may be derived based on the same voltage reference point. Further, by sharing the resistor string, the total number of circuit components in the display device may be reduced, thereby reducing overall chip area and/or manufacturing costs.

24 Claims, 10 Drawing Sheets

GAMMA RESISTOR SHARING FOR VCOM GENERATION

CROSS-REFERENCE TO RELATED APPLICATIONS

This application claims the benefit of U.S. Provisional Patent Application No. 61/316,204, entitled "Gamma Resistor Sharing for $V_{COM}$ Generation," filed Mar. 22, 2010, which is herein incorporated by reference.

BACKGROUND

The present disclosure relates generally to display devices and, more particularly, to liquid crystal display (LCD) devices.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Liquid crystal displays (LCDs) are commonly used as screens or displays for a wide variety of electronic devices, including such consumer electronics as televisions, computers, and handheld devices (e.g., cellular telephones, audio and video players, gaming systems, and so forth). Such LCD devices typically provide a flat display in a relatively thin package that is suitable for use in a variety of electronic goods. In addition, such LCD devices typically use less power than comparable display technologies, making them suitable for use in battery powered devices or in other contexts were it is desirable to minimize power usage. LCD devices typically include a plurality of unit pixels arranged in a matrix. The unit pixels may be driven by scanning line and data line circuitry to display an image that may be perceived by a user.

LCD devices typically include thousands (or millions) of picture elements, i.e., pixels, arranged in rows and columns. For any given pixel of an LCD device, the amount of light that is viewable on the LCD depends on the voltage applied to the pixel. Typically, LCDs include driving circuitry for converting digital image data into analog voltage values which may be supplied to pixels within a display panel of the LCD. An electrical field is generated by a voltage difference between a pixel electrode and a common electrode, which may align liquid crystals molecules within an adjacent liquid crystal layer to modulate light transmission through the LCD panel. In conventional displays, data signals and a common voltage signal are provided by different respective circuits which may not reference the same ground. Thus, variations in either the data signals or the common voltage signal, which may be caused by parasitic capacitances, crosstalk, line interference, and so forth, may undesirably manifest as artifacts and/or flickering on the displayed image. Further, as LCD devices and other similar displays continue to be incorporated into more and more electronic devices and, in recent years, many portable electronic devices, there is a continuing need to reduce the number of hardware components and/or chip area of circuitry for driving such displays in order to not only reduce the size and/or weight of the display, but also to reduce overall manufacturing and production costs.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The present disclosure generally relates to display devices having a data voltage generation circuit and a common voltage generation circuit that are both coupled to a common reference voltage (e.g., ground). By utilizing a shared or common ground, variations between the data signals relative to the common voltage may be reduced, thereby improving voltage precision and color accuracy in the display device. In one embodiment, the data voltage generation circuit may be a gamma adjustment circuit that utilizes a resistor string having a center grounding point. The common voltage generation circuit may share the resistor string and the grounding point with the gamma adjustment circuitry. In this manner, data voltage signals and common voltage signals may be generated based on the same voltage reference. Further, in some embodiments the sharing of a resistor string between the gamma adjustment circuit and the common voltage generation circuit may reduce the number of circuit components needed for implementing these components and may, therefore, reduce the overall size and/or area of display circuitry used to drive a display device.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

Figure 1:
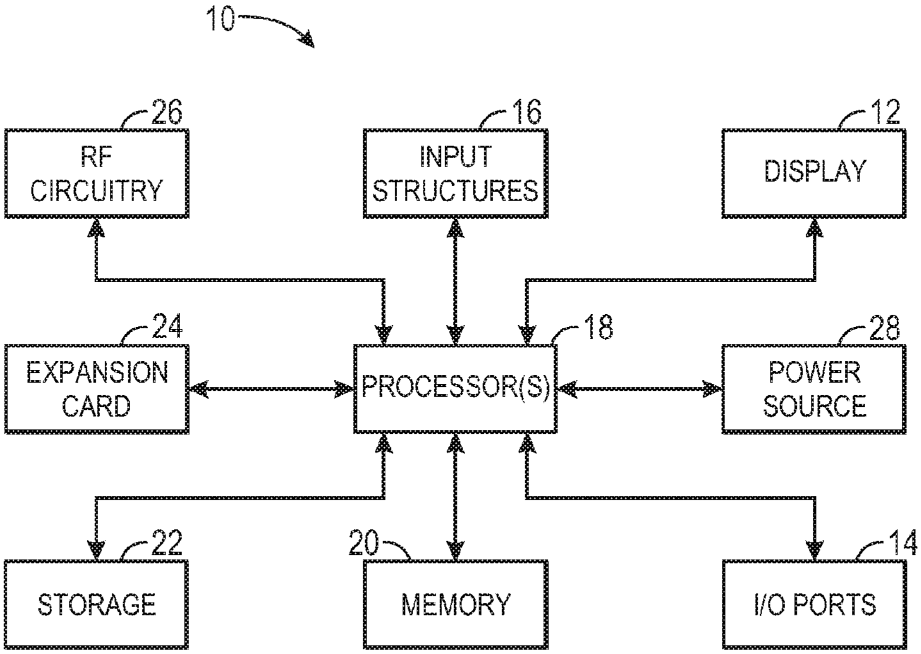
FIG. 1 is a block diagram of exemplary components of an electronic device that includes a display device, in accordance with aspects of the present disclosure.

One or more specific embodiments will be described below. These described embodiments are provided only by way of example, and do not limit the scope of the present disclosure. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments described below, the articles "a," "an," and "the" are intended to mean that there are one or more of the elements. The terms "comprising," "including," and "having" are intended to be inclusive and mean that there may be additional elements other than the listed elements. Moreover, while the term "exemplary" may be used herein in connection to certain examples of aspects or embodiments of the presently disclosed subject matter, it will be appreciated that these examples are illustrative in nature and that the term "exemplary" is not used herein to denote any preference or requirement with respect to a disclosed aspect or embodiment. Additionally, it should be understood that references to "one embodiment," "an embodiment," "some embodiments," and the like are not intended to be interpreted as excluding the existence of additional embodiments that also incorporate the disclosed features.

As will be discussed below, the present disclosure is generally directed to display devices having a data voltage generation circuit and a common voltage generation circuit that are both coupled to a common reference voltage (e.g., ground). By utilizing a common ground, variations between the data signals relative to the common voltage may be reduced, thereby improving voltage precision and color accuracy in the display device. In one embodiment, the data voltage generation circuit may be a gamma adjustment circuit that utilizes a resistor string having a center grounding point. The common voltage generation circuit may share the resistor string and the grounding point with the gamma adjustment circuitry. In this manner, data voltage signals and common voltage signals may be generated based on the same voltage reference. Further, in some embodiments the sharing of a resistor string between the gamma adjustment circuit and the common voltage generation circuit may reduce the number of circuit components needed for implementing these components and may, therefore, reduce the overall size of display circuitry used to drive a display device. As will be appreciated, this may also reduce manufacturing and/or production costs for the display device.

Figure 2:
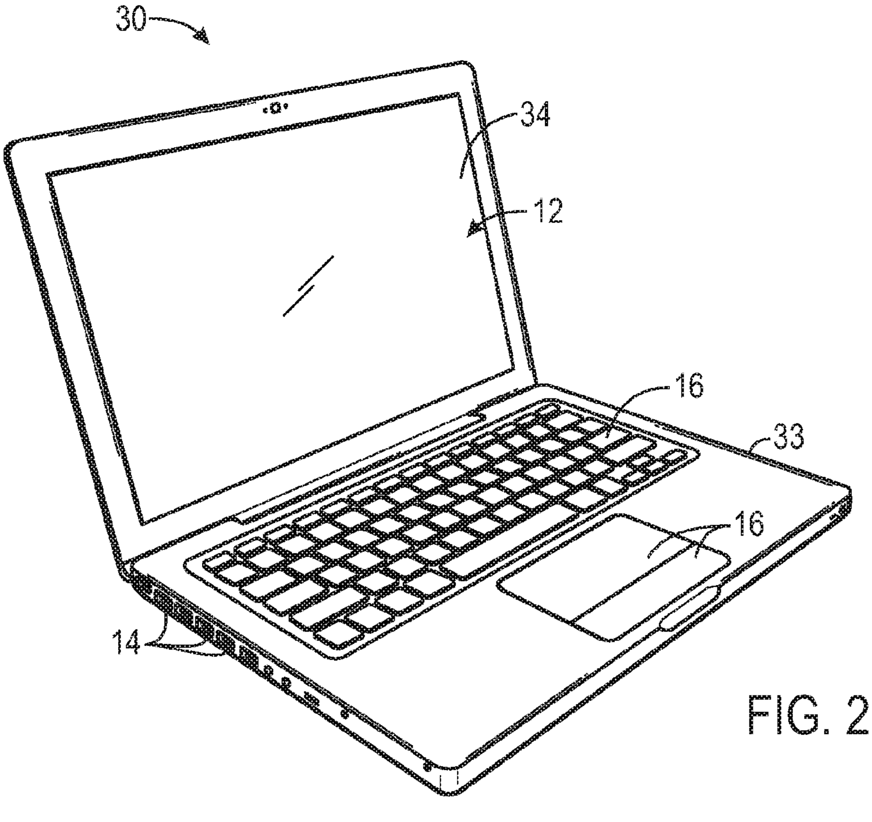
FIG. 2 is a perspective view of an electronic device in the form of a computer, in accordance with aspects of the present disclosure.
Figure 3:
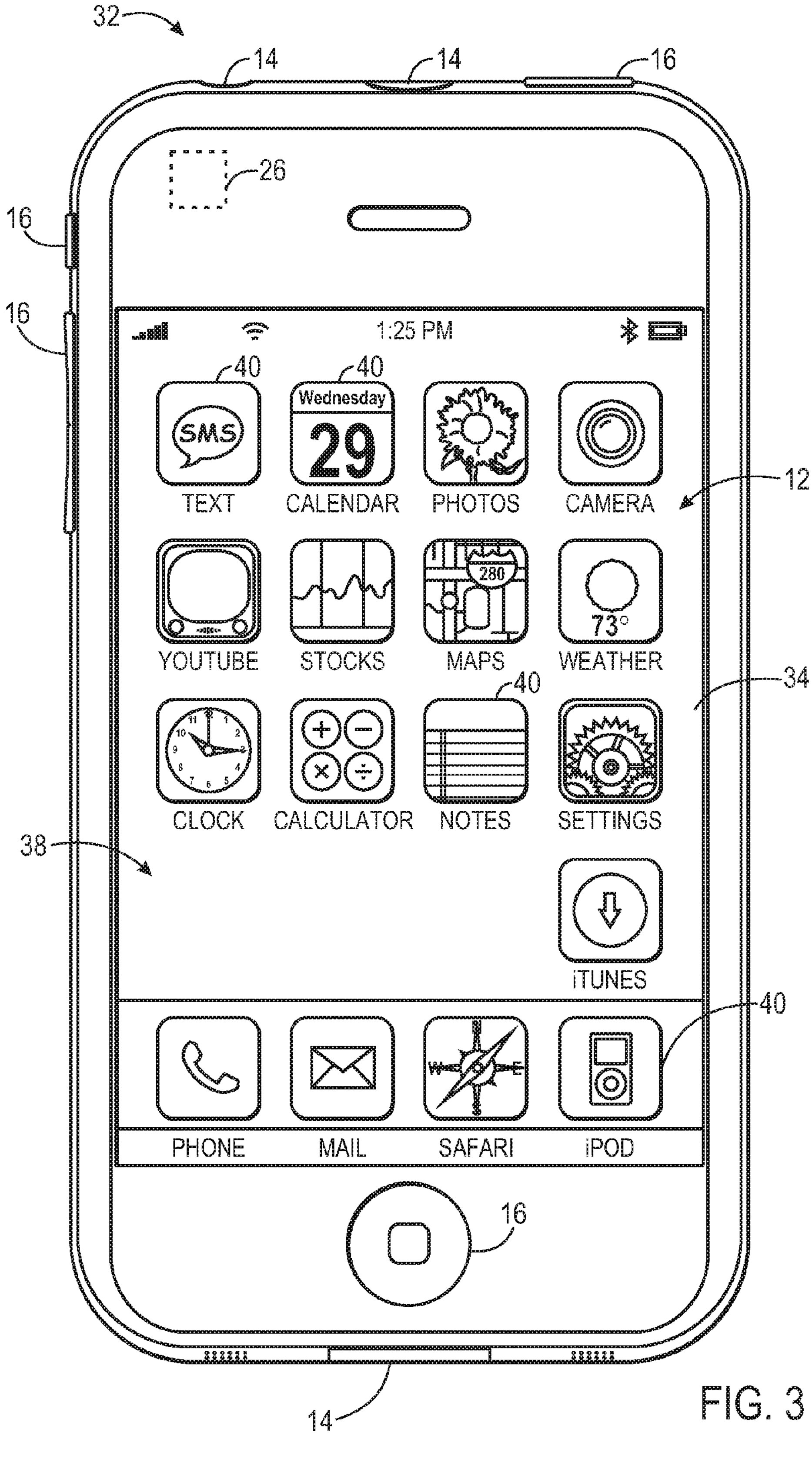
FIG. 3 is a front-view of a portable handheld electronic device, in accordance with aspects of the present disclosure.
Figure 4:
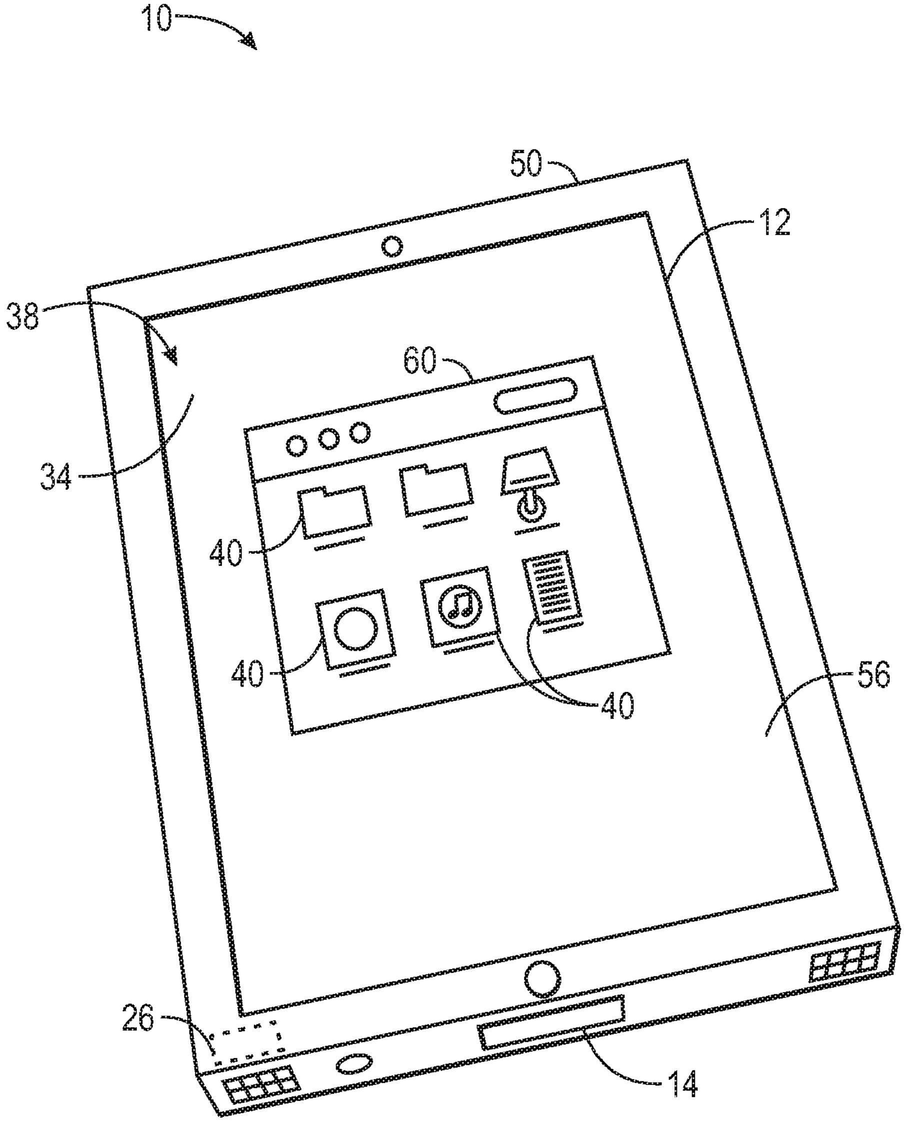
FIG. 4 is a perspective view of a tablet-style electronic device that may be used in conjunction with aspects of the present disclosure.

With these foregoing features in mind, a general description of suitable electronic devices for performing these functions is provided below with respect to FIGS. 1-4. Specifically, FIG. 1 is a block diagram depicting various components that may be present in electronic devices suitable for use with the present techniques is provided. FIG. 2 depicts an example of a suitable electronic device in the form of a computer. FIG. 3 depicts another example of a suitable electronic device in the form of a handheld portable electronic device. Additionally, FIG. 4 depicts yet another example of a suitable electronic device in the form of a computing device having a tablet-style form factor. These types of electronic devices, and other electronic devices providing comparable display capabilities, may be used in conjunction with the present techniques.

Keeping the above points in mind, FIG. 1 is a block diagram illustrating components that may be present in one such electronic device 10, and which may allow the device 10 to function in accordance with the techniques discussed herein. The various functional blocks shown in FIG. 1 may include hardware elements (including circuitry), software elements (including computer code stored on a computer-readable medium, such as a hard drive or system memory), or a combination of both hardware and software elements. It should be noted that FIG. 1 is merely one example of a particular implementation and is merely intended to illustrate the types of components that may be present in the electronic device 10. For example, in the illustrated embodiment, these components may include a display 12, input/output (I/O) ports 14, input structures 16, one or more processors 18, memory device(s) 20, non-volatile storage 22, expansion card(s) 24, RF circuitry 26, and power source 28.

The display 12 may be used to display various images generated by the electronic device 10. The display may be any suitable display such as a liquid crystal display (LCD), a plasma display, or an organic light emitting diode (OLED) display, for example. In one embodiment, the display 12 may be an LCD employing fringe field switching (FFS), in-plane switching (IPS), or other techniques useful in operating such LCD devices. The display 12 may be a color display utilizing a plurality of color channels for generating color images. By way of example, the display 12 may utilize a red, green, and blue color channel. The display 12 may include gamma adjustment circuitry configured to convert digital levels (e.g., gray levels) into analog voltage data in accordance with a target gamma curve. By way of example, such conversion may be facilitated using a digital-to-analog converter, which may include one or more resistor strings, to produce "gamma-corrected" voltage data.

In certain embodiments, the display 12 may include an arrangement of unit pixels defining rows and columns that form an image viewable region of the display 12. A source driver circuit may output this voltage data to the display 12 by way of source lines defining each column of the display 12. Each unit pixel may include a thin film transistor (TFT) configured to switch a pixel electrode. A liquid crystal capacitor may be formed between the pixel electrode and a common electrode, which may be coupled to a common voltage line ($V_{COM}$). When activated, the TFT may store image signals received via a respective data or source line as a charge in the pixel electrode. The image signals stored by the pixel electrode may be used to generate an electrical field between the respective pixel electrode and a common electrode. Such an electrical field may align liquid crystals molecules within an adjacent liquid crystal layer to modulate light transmission through the liquid crystal layer. As will be discussed further below, embodiments of the present technique may provide for a common voltage ($V_{COM}$) generation circuit that shares a common reference (e.g., ground) with the above-mentioned gamma adjustment circuitry, such as by sharing a common resistor string from which data voltages and common voltage values may be derived. Such a technique may reduce variations in the data signals relative to the common voltage signals and may, therefore, improve overall voltage precision and color accuracy in the display 12. Further, the sharing of a resistor string between a $V_{COM}$ circuit and a gamma circuit may reduce the total number of circuit components in the display device 12, which may reduce overall chip area and manufacturing costs.

In some embodiments, the present techniques may also be applied to displays that utilize multiple common voltage lines. For instance, in one implementation, two or more common voltages may be supplied to respective common voltage lines coupled to respective sets of pixels to define discrete regions within an integrally-formed touch sensing system. An example of a display device that may utilize two or more common voltages to provide touch sensing functions is generally disclosed in the co-pending and commonly assigned U.S. patent application Ser. No. 12/240,964, entitled "Display With Dual-Function Capacitive Elements" filed Sep. 29, 2008, the entirety of which is hereby incorporated by reference for all purposes.

Such a touch sensing system may be provided in conjunction with the display 12 and may be commonly referred to as a touchscreen. The touchscreen that may be used as part of a control interface for the device 10. In such embodiments, the touchscreen may be formed integrally with the display 12 as one of the input structures 16. For instance, certain capacitive elements forming the pixels of the display 12 may dually function as pixel storage capacitors or as capacitive elements of a touch sensing system for detecting touch inputs. In this manner, a user may interact with the device by touching the display 12, such as by way of the user's finger or a stylus.

FIG. 2 illustrates an embodiment of the electronic device 10 in the form of a computer 30. The computer 30 may include computers that are generally portable (such as laptop, notebook, tablet, and handheld computers), as well as computers that are generally used in one place (such as conventional desktop computers, workstations and/or servers). In certain embodiments, the electronic device 10 in the form of a computer may be a model of a MacBook®, MacBook® Pro, MacBook Air®, iMac®, Mac® Mini, or Mac Pro®, available from Apple Inc. of Cupertino, Calif. The depicted computer 30 includes a housing or enclosure 33, the display 12 (e.g., as an LCD 34 or some other suitable display), I/O ports 14, and input structures 16.

The display 12 may be integrated with the computer 30 (e.g., such as the display of a laptop computer) or may be a standalone display that interfaces with the computer 30 using one of the I/O ports 14, such as via a DisplayPort, DVI, High-Definition Multimedia Interface (HDMI), or analog (D-sub) interface. For instance, in certain embodiments, such a standalone display 12 may be a model of an Apple Cinema Display®, available from Apple Inc. As will be discussed below, the display 12 may include a common voltage ($V_{COM}$) generation circuit that shares a common reference (e.g., ground) with a gamma adjustment circuit, such as by sharing a common resistor string from which data voltages and common voltage values may be derived.

The electronic device 10 may also take the form of other types of devices, such as mobile telephones, media players, personal data organizers, handheld game platforms, cameras, and/or combinations of such devices. For instance, as generally depicted in FIG. 3, the device 10 may be provided in the form of a handheld electronic device 32 that includes various functionalities (such as the ability to take pictures, make telephone calls, access the Internet, communicate via email, record audio and/or video, listen to music, play games, connect to wireless networks, and so forth). By way of example, the handheld device 32 may be a model of an iPod®, iPod® Touch, or iPhone® available from Apple Inc.

In the depicted embodiment, the handheld device 32 includes the display 12, which may be in the form of an LCD 34. The LCD 34 may display various images generated by the handheld device 32, such as a graphical user interface (GUI) 38 having one or more icons 40. As will be discussed below, the display 12/LCD 34 may include a common voltage ($V_{COM}$) generation circuit that shares a common reference (e.g., ground) with a gamma adjustment circuit. As will be appreciated, such a technique may reduce variations in the data signals relative to the common voltage and may, therefore, improve voltage precision and color accuracy in the display 12. In one embodiment, a common reference point may be provided by sharing a resistor string between the common voltage ($V_{COM}$) generation circuit and the gamma adjustment circuit. For instance, in certain conventional displays, a $V_{COM}$ circuit and a gamma circuit may utilize separate respective resistor strings. Thus, the sharing of a resistor string between a $V_{COM}$ circuit and a gamma circuit may reduce the total number of circuit components in the display device 12, which may reduce overall chip area and manufacturing costs.

In another embodiment, the electronic device 10 may also be provided in the form of a portable multi-function tablet computing device 50, as depicted in FIG. 4. In certain embodiments, the tablet computing device 50 may provide the functionality of two or more of a media player, a web browser, a cellular phone, a gaming platform, a personal data organizer, and so forth. By way of example only, the tablet computing device 50 may be a model of an iPad tablet computer, available from Apple Inc.

The tablet device 50 includes the display 12 in the form of an LCD 34 that may be used to display GUI 38. The GUI 38 may include graphical elements that represent applications and functions of the tablet device 50. For instance, the GUI 38 may include various layers, windows 60, screens, templates, or other graphical elements that may be displayed in all, or a portion, of the display 12. As shown in FIG. 4, the LCD 34 may include a touch-sensing system 56 (e.g., a touchscreen) that allows a user to interact with the tablet device 50 and the GUI 38. By way of example only, the operating system GUI 38 displayed in FIG. 4 may be from a version of the Mac OS® (e.g., OS X) operating system, available from Apple Inc.

Figure 5:
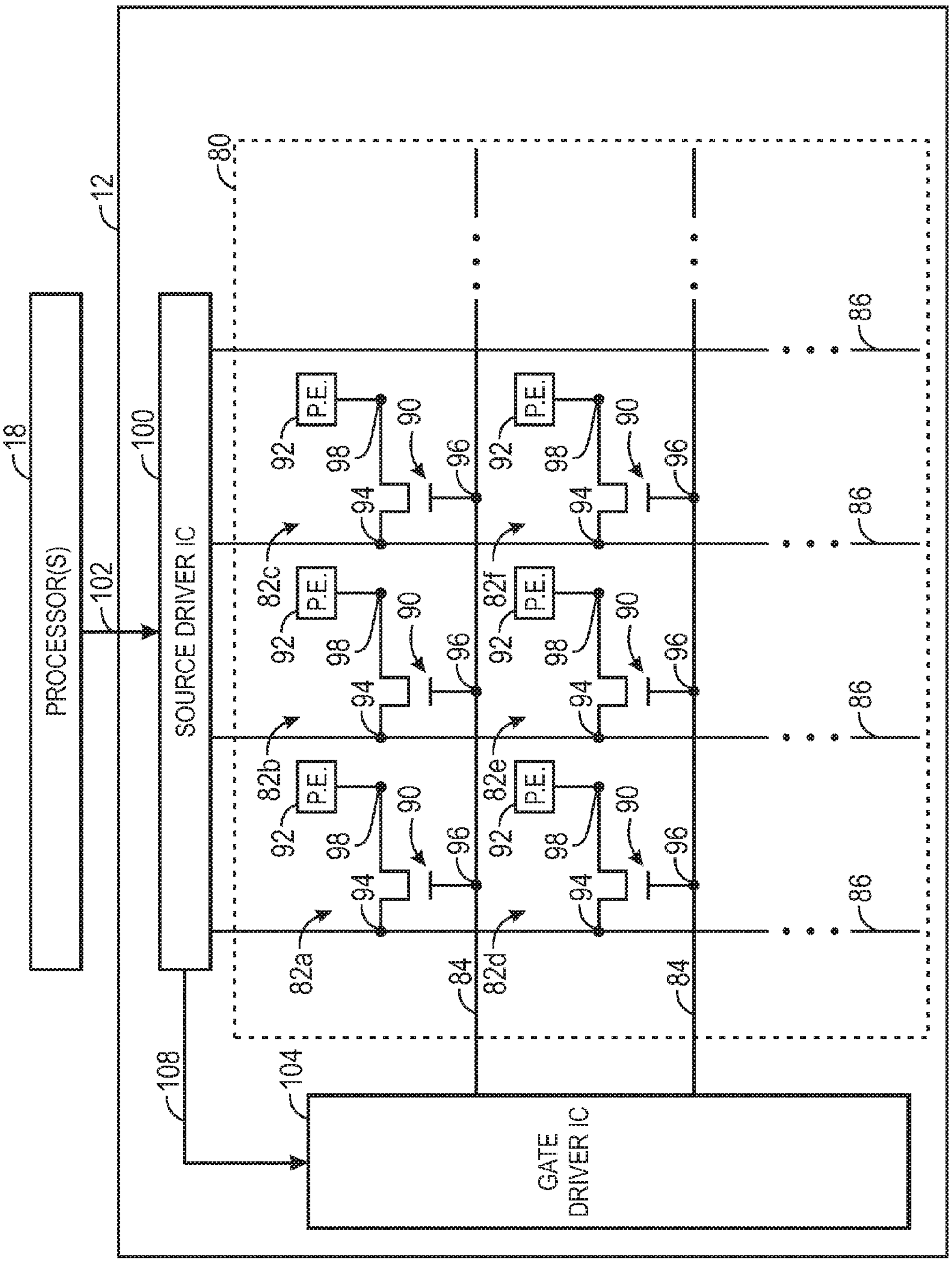
FIG. 5 is a circuit diagram illustrating the structure of unit pixels that may be provided in the display device of FIG. 1, in accordance with aspects of the present disclosure.

Referring now to FIG. 5 a circuit diagram of the display 12 is illustrated, in accordance with an embodiment. As shown, the display 12 may include a display panel 80, such as a liquid crystal display panel. The display panel 80 may include multiple unit pixels 82 disposed in a pixel array or matrix defining multiple rows and columns of unit pixels that collectively form an image viewable region of the display 12. In such an array, each unit pixel 82 may be defined by the intersection of rows and columns, represented here by the illustrated gate lines 84 (also referred to as "scanning lines") and source lines 86 (also referred to as "data lines"), respectively.

Although only six unit pixels, referred to individually by the reference numbers 82*a*-82*f*, respectively, are shown for purposes of simplicity, it should be understood that in an actual implementation, each source line 86 and gate line 84 may include hundreds or even thousands of such unit pixels 82. By way of example, in a color display panel 80 having a display resolution of 1024×768, each source line 86, which may define a column of the pixel array, may include 768 unit pixels, while each gate line 84, which may define a row of the pixel array, may include 1024 groups of unit pixels, wherein each group includes a red, blue, and green pixel, thus totaling 3072 unit pixels per gate line 84. By way of further example, the panel 80 may have a display resolution of 480×320 or, alternatively, 960×640. As will be appreciated, in the context of LCDs, the color of a particular unit pixel generally depends on a particular color filter that is disposed over a liquid crystal layer of the unit pixel. In the presently illustrated example, the group of unit pixels 82*a*-82*c* may represent a group of pixels having a red pixel (82*a*), a blue pixel (82*b*), and a green pixel (82*c*). The group of unit pixels 82*d*-82*f* may be arranged in a similar manner.

As shown in the present embodiment, each unit pixel 32*a*-32*f* includes a thin film transistor (TFT) 90 for switching a respective pixel electrode 92. In the depicted embodiment, the source 94 of each TFT 90 may be electrically connected to a source line 86. Similarly, the gate 96 of each TFT 90 may be electrically connected to a gate line 84. Furthermore, the drain 98 of each TFT 90 may be electrically connected to a respective pixel electrode 92. Each TFT 90 serves as a switching element which may be activated and deactivated (e.g., turned on and off) for a predetermined period based upon the respective presence or absence of a scanning signal at the gate 96 of the TFT 90. For instance, when activated, the TFT 90 may store the image signals received via a respective source line 86 as a charge its corresponding pixel electrode 92. The image signals stored by pixel electrode 92 may be used to generate an electrical field between the respective pixel electrode 92 and a common electrode (not shown in FIG. 5). As discussed above, the pixel electrode 92 and the common electrode may form a liquid crystal capacitor for a given unit pixel 82. Thus, in an LCD panel 80, such an electrical field may align liquid crystals molecules within a liquid crystal layer to modulate light transmission through a region of the liquid crystal layer that corresponds to the unit pixel 82. For instance, light is typically transmitted through the unit pixel 82 at an intensity corresponding to the applied voltage (e.g., from a corresponding source line 86).

The display 12 also includes a source driver integrated circuit (source driver IC) 100, which may include a chip, such as a processor or ASIC, that is configured to control various aspects of display 12 and panel 80. For example, the source driver IC 100 may receive image data 102 from the processor(s) 18 and send corresponding image signals to the unit pixels 82 of the panel 80. The source driver IC 100 may also be coupled to a gate driver IC 104, which may be configured to activate or deactivate rows of unit pixels 82 via the gate lines 84. As such, the source driver IC 100 may send timing information, shown here by reference number 108, to gate driver IC 104 to facilitate activation/deactivation of individual rows of pixels 82. In other embodiments, timing information may be provided to the gate driver IC 104 in some other manner. While the illustrated embodiment shows only a single source driver IC 100 coupled to panel 80 for purposes of simplicity, it should be appreciated that additional embodiments may utilize multiple source driver ICs 100 for providing image signals to the pixels 82. For example, additional embodiments may include multiple source driver ICs 100 disposed along one or more edges of the panel 80, wherein each source driver IC 100 is configured to control a subset of the source lines 86 and/or gate lines 84.

In operation, the source driver IC 100 receives image data 102 from the processor 18 or a discrete display controller and, based on the received data, outputs signals to control the pixels 82. For instance, to display image data 102, the source driver IC 100 may adjust the voltage of the pixel electrodes 92 (abbreviated in FIG. 2 as P.E.) one row at a time. To access an individual row of pixels 82, the gate driver IC 104 may send an activation signal to the TFTs 90 associated with the particular row of pixels 82 being addressed. This activation signal may render the TFTs 90 on the addressed row conductive. Accordingly, image data 102 corresponding to the addressed row may be transmitted from source driver IC 100 to each of the unit pixels 82 within the addressed row via respective data lines 86. Thereafter, the gate driver IC 104 may deactivate the TFTs 90 in the addressed row, thereby impeding the pixels 82 within that row from changing state until the next time they are addressed. The above-described process may be repeated for each row of pixels 82 in the panel 80 to reproduce image data 102 as a viewable image on the display 12.

Figure 6:
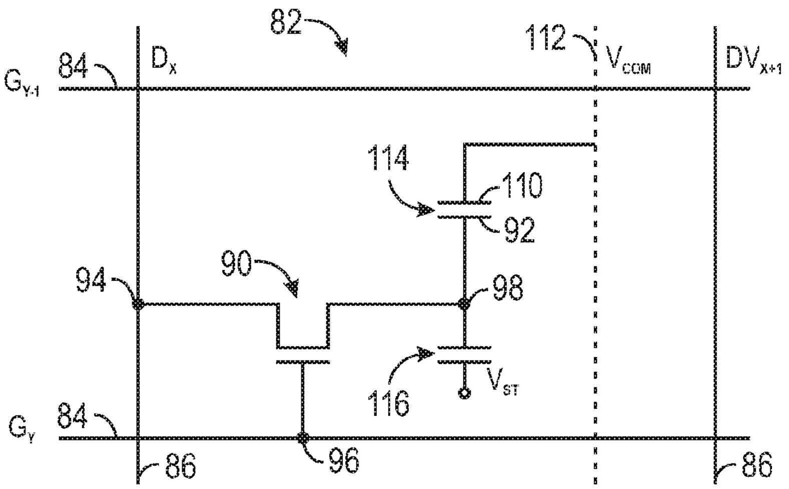
FIG. 6 is a circuit diagram depicting a single unit pixel, in accordance with aspects of the present disclosure.

Referring briefly to FIG. 6, a circuit diagram of an embodiment of a pixel 82 is illustrated in greater detail. As shown, the TFT 90 is coupled to the source line 86 ($D_x$) and the gate line 84 ($G_y$). The pixel electrode 92 and the common electrode 110 may form a liquid crystal capacitor 114. The common electrode 110 is coupled to a common voltage line 112 that supplies the common voltage $V_{COM}$. The $V_{COM}$ line 112 may be formed parallel to the scanning line 86 ($D_x$) to which the pixel 82 is coupled. In the present embodiment, the pixel 82 also includes a storage capacitor 116 having a first electrode coupled to the drain 98 of the TFT 90 and a second electrode coupled to a storage electrode line that supplies the voltage $V_{ST}$. In other embodiments, the second electrode of the storage capacitor 116 may be coupled instead to the previous gate line 84 (e.g., $G_{y-1}$) or to ground. As will be appreciated, the storage capacitor 116 may sustain the pixel electrode voltage during holding periods (e.g., until the next time the gate line 84 ($G_y$) is activated by the gate driver IC 104.

Referring back to FIG. 5, in sending image data to each of the pixels 82, a digital image is typically converted into numerical data so that it can be interpreted by a display device. For instance, the image 102 may itself be divided into small "pixel" portions, each of which may correspond to a respective pixel 82 of the panel 80. In order to avoid confusion with the physical unit pixels 82 of the panel 80, the pixel portions of the image 102 shall be referred to herein as "image pixels." Each image pixel of the image 102 may be associated with a numerical value, which may be referred to as a "digital level" that quantifies the luminance intensity (e.g., brightness or darkness) of the image 102 at a particular spot. The digital level of each image pixel may represent a shade of darkness or brightness between black and white, commonly referred to as a gray level.

The number of gray levels in an image usually depends on the number of bits used to represent pixel intensity levels in a display device, which may be expressed as $2^N$ gray levels, where N is the number of bits used to express a digital level. By way of example, in an embodiment where the display 12 is a normally black display using 10 bits to represent a digital level, the display 12 may be capable of providing 1024 gray levels (e.g., $2^{10}$) to display an image, wherein a digital level of 0 corresponds to full black (e.g., no transmittance), and a digital level of 1023 corresponds to full white (e.g., full transmittance). Similarly, if 8 bits are used to represent a digital level, then 256 gray levels (e.g., $2^8$) may be available for displaying an image. To provide an example, in one embodiment, the source driver IC 100 may receive an image data stream equivalent to 24 bits of data, with 8-bits of the image data stream corresponding to a digital level for each of the red, green, and blue color channels corresponding to a pixel group having each of a red, green, and blue unit pixel (e.g., 82*a*-82*c* or 82*d*-82*f*). Further, although digital levels corresponding to luminance are generally expressed in terms of gray levels, where a display utilizes multiple color channels (e.g., red, green, blue), the portion of the image corresponding to each color channel may be individually expressed as in terms of such gray levels. Accordingly, while the digital level data for each color channel may be interpreted as a grayscale image, when processed and displayed using unit pixels 82 of the panel 80, color filters (e.g., red, blue, and green) overlaying each unit pixel 32 allows the image to be perceived by a viewer as being a color image.

To convert gray level data to analog signals, a digital-to-analog converter is typically provided and is sometimes referred to as a gamma adjustment circuit. As will be appreciated, the luminance characteristics of viewable representations of digital image data displayed by a display device, such as the display 12, may not always be reproduced accurately (e.g., relative to "raw" image data 102) when perceived by the human eye viewing the display 12. Generally, such inaccuracies may be attributed at least partially to the digital-to-analog conversion of digital levels within source driver IC 100, a luminance transfer function associated with the display panel 80, and/or the non-linear response of the human eye, which generally perceives digital or gray levels in a non-linear manner with respect to luminance. Additionally, the various components making up the display 12, such as the source driver IC 100 and panel 80, may often be manufactured by different vendors. Thus, where the source driver IC 100 includes digital-to-analog conversion circuitry in the form of a resistor string, the resistor values selected by one vendor may not always match the requirements of a panel 80 produced by a different vendor, thus resulting in gamma inaccuracies.

Accordingly, a gamma adjustment circuit is generally responsible for converting the gray level data and compensating for such inaccuracies so that the human eye perceives the image data displayed on the panel 80 as having a generally linear relationship with regard to digital levels and perceived brightness. In some embodiments, gamma may be adjusted independently for each color channel (e.g., red, green, and blue).

Figure 7:
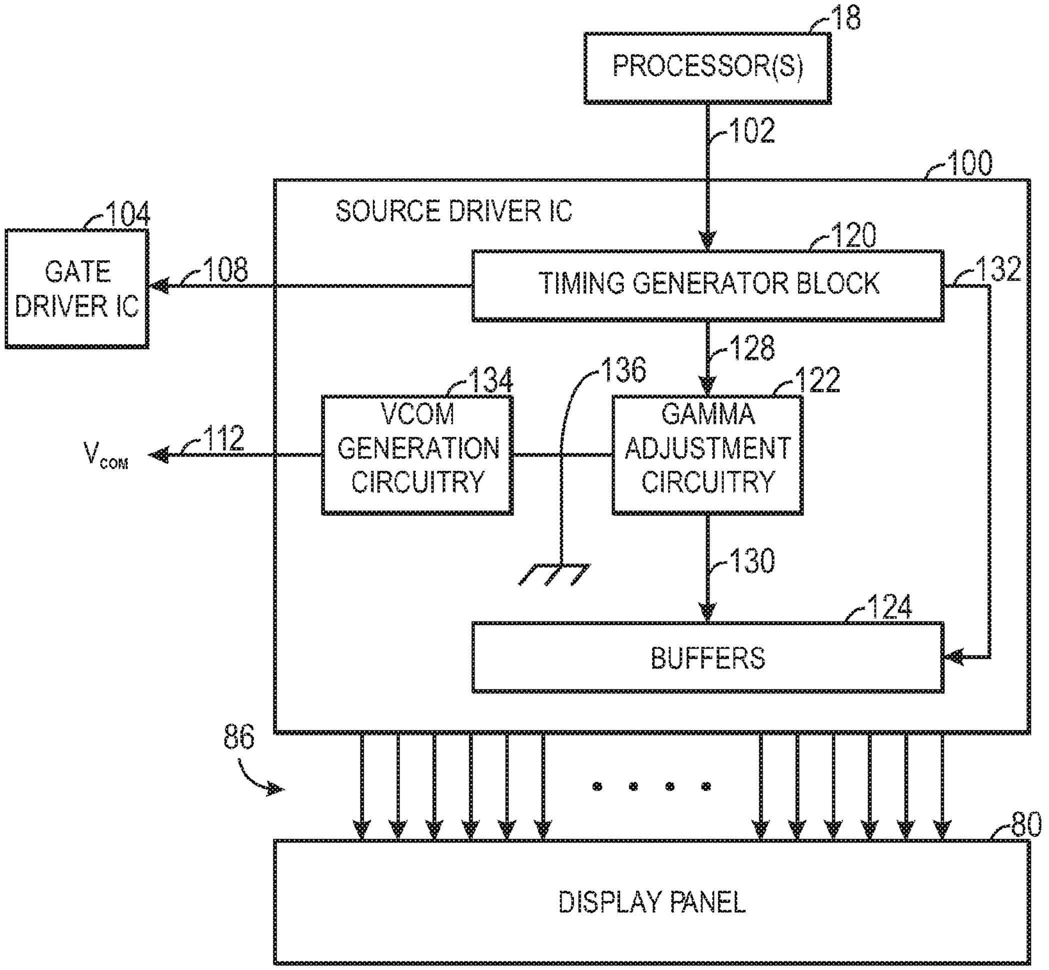
FIG. 7 is a block diagram showing a processor and an example of a source driver integrated circuit (IC) of FIG. 5, in accordance with aspects of the present disclosure.

Continuing to FIG. 7, a more detailed block diagram of the source driver IC 100 is illustrated. As shown, the source driver IC 100 may include various logic blocks for processing image data 102 received from the processor 18, including a timing generator block 120, gamma adjustment circuitry 122, and one or more frame buffers 124. The timing generator block 120 may generate appropriate timing signals for controlling the source driver IC 100 and gate driver IC 104. For instance, the timing generator block 120 may control the transmission of image data 102 to the gamma adjustment circuitry 122, frame buffers 124, and source lines 86. By way of example, timing generator block 120 may provide a portion 128 of the image data 102 to gamma adjustment circuitry 122 in a timed manner. For instance, the portion 128 of image data 102 may represent image signals transmitted in line-sequence via a predetermined timing. The timing generator block 120 may additionally provide appropriate timing signals 108 to the gate driver IC 104, such that scanning signals along the gate lines 84 (FIG. 5) may be applied by line sequence with a predetermined timing and/or in a pulsed manner to appropriate rows of unit pixels 82.

As mentioned above, gamma correction or adjustment may be utilized to compensate for inaccuracies that occur in reproducing viewable representations of digital image data, such as those resulting from the non-linear human eye response and/or the digital-to-analog conversion of gray levels. Embodiments of the source driver IC 100 may provide a single gamma adjustment circuit 122 that applies to all color channels, or may provide separate gamma adjustment circuits to provide for the independent gamma adjustment of multiple color channels, such as a red, green, and blue channel.

In one embodiment, the gamma adjustment circuit 122 may be a digital-to-analog converter that includes one or more resistor strings. For instance, the gamma adjustment circuit 122 may include a first stage of resistors arranged in a string configuration (a resistor string) that may provide multiple voltages that may be selected as adjustment or tap voltages. The selected tap voltages may be provided to a second stage resistor string that is used to select the gamma voltages. For instance, the voltage adjustment or tap points may modify the voltage division ratios along the second resistor string, thereby modifying one or more of the gamma output voltage levels. The gamma voltage values may be supplied to a selection circuit, such as multiplexer, which selects the appropriate voltage based upon a corresponding gray level. As will be appreciated, the location of the tap points may be selected based upon transmittance sensitivities of a particular color channel to applied voltage levels. Embodiments of such a gamma adjustment circuit will be discussed further below in FIG. 8. Further, while various embodiments disclosed herein pertain to displays having red, green, and blue channels (RGB), it should be appreciated that displays in additional embodiments may utilize other suitable color configurations, such as a four-channel red, green, blue, and white (RGBW) display, or a cyan, magenta, yellow, and black (CMYB) display. The frame buffer(s) 124 may receive voltage signals representing "gamma-corrected" image data 130. The frame buffer 124, which may also receive timing signals 132 from the timing generator block 120, may output the gamma-corrected image data 130 to the display panel 80 by way of source lines 86.

The illustrated source driver IC 100 also includes $V_{COM}$ generation circuitry 134, which may be configured to provide a common voltage ($V_{COM}$) to the common voltage line 112. As discussed above, the common voltage $V_{COM}$ may be provided to the common electrode 110 of each pixel 82, while a data voltage (e.g., representing image data) is provided to the pixel electrode 92. Accordingly, an electrical field is generated by a voltage difference between the pixel electrode 92 and the common electrode 110, which may align liquid crystals molecules within an adjacent liquid crystal layer to modulate light transmission through the panel 80. Further, while shown as being integrated with the source driver IC 100, in other embodiments, the $V_{COM}$ generation circuitry 134, the gamma adjustment circuitry 122, as well as the timing generator 120, may be separate from the source driver IC 100.

Generally, the $V_{COM}$ generation circuitry 134 may include a digital-to-analog converter, such as a resistor string, for producing $V_{COM}$. Generally, $V_{COM}$ is provided at a level close to but not at 0 volts, such as at approximately 0.4 to 0.5 volts, to compensate for parasitic capacitances within the panel 80. When the voltage at the gate 96 decreases, $V_{COM}$ is generally raised to compensate for the gate voltage drop, which may prevent flickering. As depicted in FIG. 7, the $V_{COM}$ generation circuitry 134 may share a common ground or reference voltage 136 with the gamma adjustment circuitry 122. This may reduce variations in the data signals relative to the common voltage ($V_{COM}$) and may, therefore, improve voltage precision and color accuracy in the display 12. That is, because $V_{COM}$ is tied to the same reference as the data signals, any variations due to interference, crosstalk, parasitic capacitances, and so forth, will be present in both $V_{COM}$ and the data signals, thus effectively cancelling out such variations. As will be discussed below, in one implementation, a common reference voltage may be provided by sharing a resistor string between the common voltage ($V_{COM}$) generation circuit 134 and the gamma adjustment circuit 122. In such an embodiment, reference number 136 may represent the shared resistor string and the common grounding point.

Further, in some embodiments, the sharing of a resistor string between the gamma adjustment circuit and the common voltage generation circuit may reduce the number of circuit components needed for implementing these components and may, therefore, reduce the overall size of display circuitry used to drive the display panel 80. As can be appreciated, this may reduce the overall cost for manufacturing and/or producing the display 12. Additionally, as will be discussed further below, because a resistor string is shared to derive the data voltages and the common voltage(s), an additional resistor string may be utilized in the $V_{COM}$ generation circuit 134 to provide for improved (e.g., finer) resolution in the selection of $V_{COM}$ values.

Figure 8:
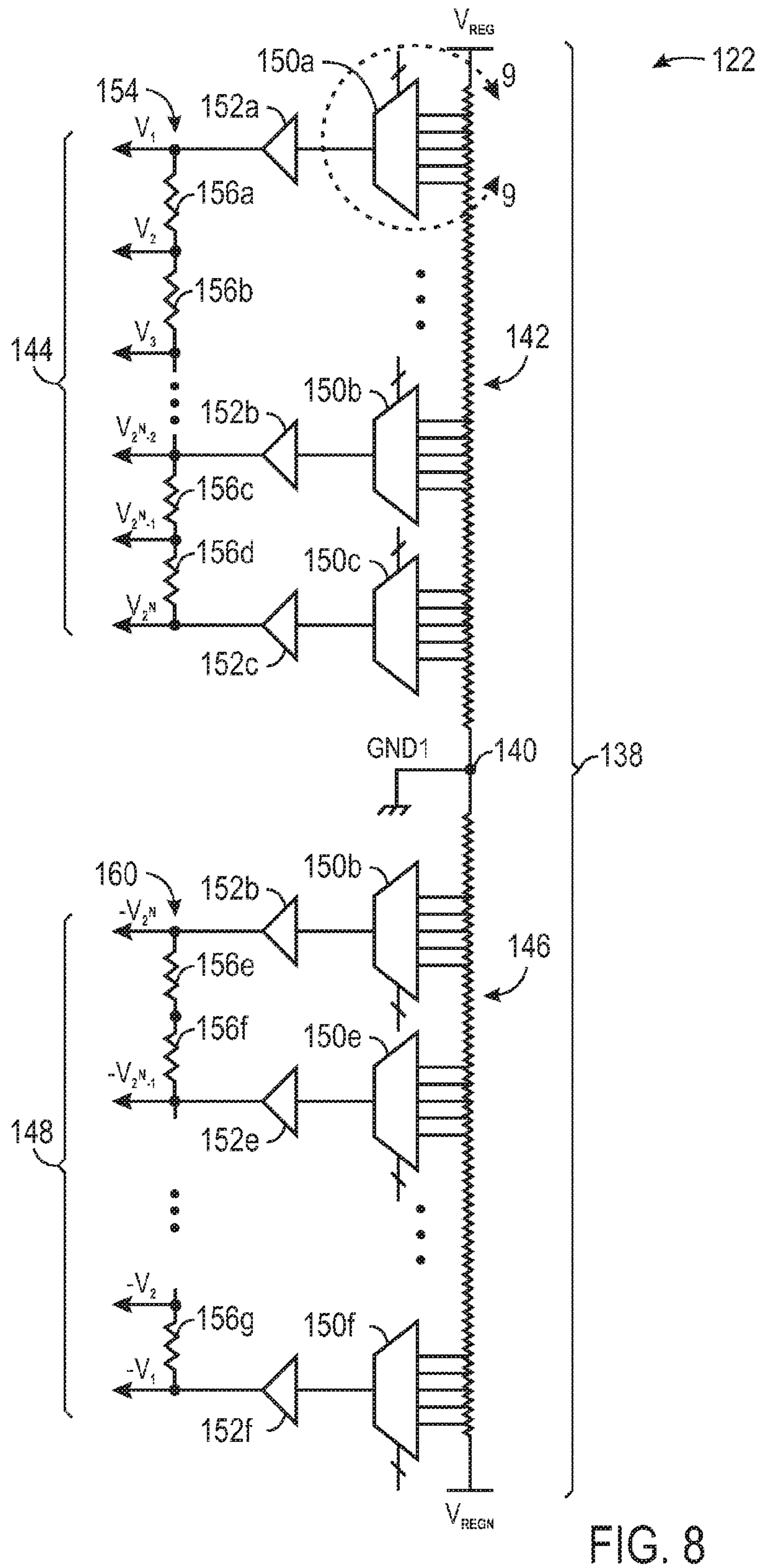
FIG. 8 is a diagram of a gamma adjustment circuit, in accordance with aspects of the present disclosure.
Figure 9:
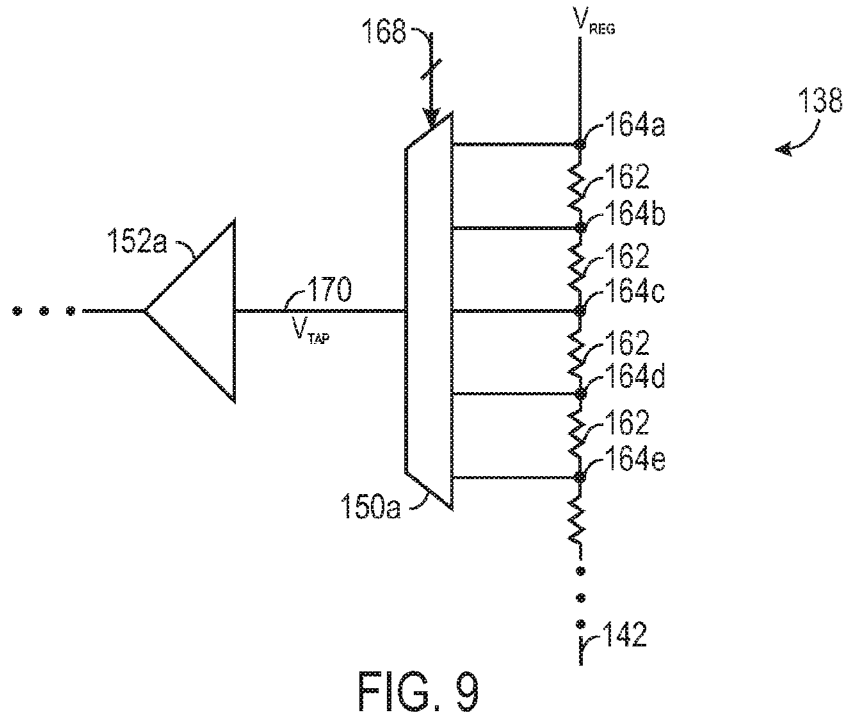
FIG. 9 is a magnified view of a portion of the gamma adjustment circuit of FIG. 8, in accordance with aspects of the present disclosure.
Figure 10:
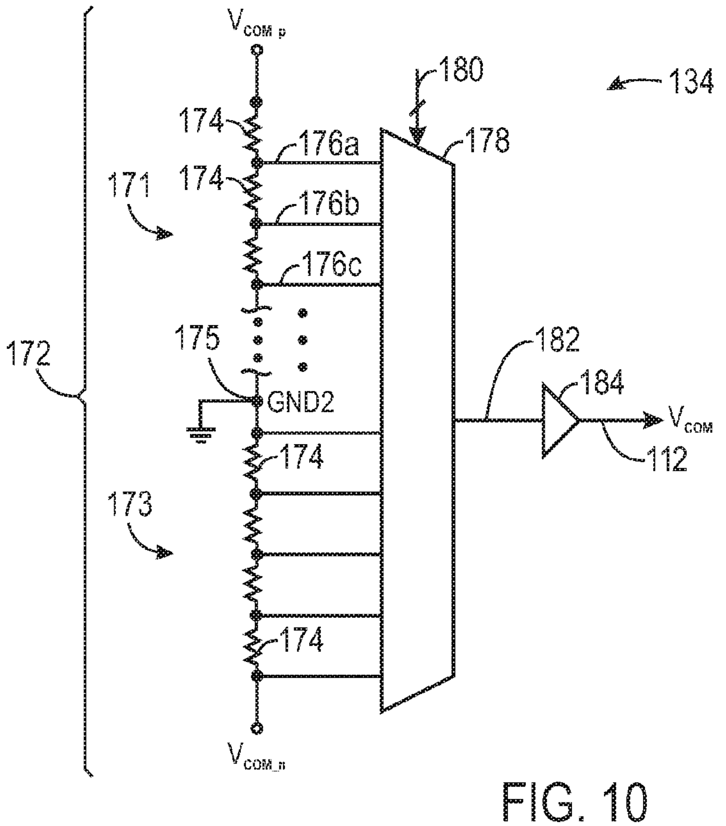
FIG. 10 is a block diagram of a common voltage generation circuit, in accordance with aspects of the present disclosure.

Before describing such an embodiment, FIGS. 8, 9, and 10 are intended to depict a conventional display panel that may include gamma adjustment circuitry 122 and $V_{COM}$ generation circuitry 134 that does not share a common reference. Referring to FIG. 8, an embodiment of the gamma adjustment circuitry 122 (gamma circuitry) is illustrated. The gamma circuitry 122 includes a first resistor string 138 grounded (GND1) at node 140 to create a positive side 142 and a negative side 146. As will be appreciated, if an electrical field generated between the pixel electrode 92 and the common electrode 110 is applied in the same direction continuously, this may degrade the liquid crystal material within display 12 over time. Thus to prevent degradation of the liquid crystal, the image signals provided to the display 12 are driven by alternating their polarity with respect to $V_{COM}$, thereby causing the direction of the electric field to alternate. Such a driving method may be referred to as line inversion, column inversion, or dot inversion. Accordingly, the positive side 142 is used to provide tap voltages for generating the positive gamma voltages 144 (when the image signals are driven positive), and the negative side 146 is used to provide tap voltages for generating the negative gamma voltages 148.

The first resistor string 138 may be a linear resistor string that provides evenly distributed voltages between $V_{REG}$ and $V_{REGN}$ along the positive side 142 and the negative side 144. $V_{REG}$ may represent a regulated voltage provided to the gamma circuitry 122 to isolate the gamma curve from interference within the display 12 and/or source driver IC 100. By way of example only, $V_{REG}$ may be approximately 4 to 5 volts. While the discussion below focuses on the positive side 142, it should be appreciated that the negative side 144 of the gamma circuitry 122 may function in a similar manner. As shown, voltages from the positive side 142 are provided to selection circuits 150*a*, 150*b*, and 150*c*, which may be multiplexers. While only three multiplexers are depicted as being coupled to the positive side 142, any number of multiplexers may be provided. Each of the multiplexers 150 receives multiple voltages from the resistor string 138 and, in response to a respective control signal, outputs a selected voltage. The selected voltages from each multiplexers 150 is passed to a respective analog buffer 152 before being provided to the second resistor string 154 as adjustment voltages.

The second resistor string 154 utilizes the outputs of the buffers 152 as voltage taps to create a non-linear curve that is consistent with a target gamma curve (e.g., a non-linear curve matches the response of the human eye to generate an image that is perceived as having a linear brightness-to-gray-level relationship). For instance, the resistor string 154 includes multiple resistors 156 and provides the voltages $V_1$ to $V_{2^N}$, wherein N represents the resolution of the image data in bits. By way of example, 8-bit image data may result in gamma voltages $V_1$ to $V_{256}$. Though not shown in FIG. 8, the $2^N$ positive gamma voltages 144 are provided to a multiplexer that receives the current gray level as a control signal. Based on the gray level, the appropriate gamma voltage is selected.

FIG. 9 is a magnified view showing the region of the gamma circuit 122 enclosed by line 9-9 of FIG. 8. For instance, FIG. 9 depicts that the resistor string 138 includes multiple resistors 162 to provide voltages 164*a*-164*e* to the multiplexer 150*a*. As discussed above, the resistor string 138 may be a linear voltage divider, whereby each of the resistors 162 has the same resistance value. The multiplexer 150*a* selects one of the voltages 164*a*-164*e* based upon the control signal 168, and outputs the selected voltage 170 to the analog buffer 152*a*. This configuration may be similar for each multiplexer 150 coupled to the first resistor string 138.

FIG. 10 illustrates an embodiment of the $V_{COM}$ generation circuitry 134 that does not share a common reference voltage or a common resistor string with the gamma circuitry 122. The $V_{COM}$ generation circuitry 134 includes a resistor string 172 coupled between a positive common voltage supply ($V_{COM\_P}$) and a negative common voltage supply ($V_{COM\_N}$) and grounded (GND2) at node 175 to create a positive side 171 and a negative side 173. The resistor string 172 includes the resistors 174. In one embodiment, the resistor string 172 may be a linear resistor string in which each of the resistors 174 has the same resistance. As will be appreciated, the resistor string 172 essentially functions as a voltage divider that provides the voltages 176. The voltages 176 are provided to a selection circuit, such as multiplexer 178, which selects an appropriate voltage for $V_{COM}$ in response to a control signal 180. The selected $V_{COM}$ voltage 182 is provided to an analog buffer 184 before being transmitted to common electrodes 110 of the pixels 82 via the $V_{COM}$ line 112.

The steps between each voltage 176 (e.g., between 176*a* and 176*b*) may represent the resolution by which $V_{COM}$ may be selected. By way of example only, in one embodiment, $V_{COM\_P}$ may be approximately 2 volts, $V_{COM\_N}$ may be approximately −2 volts, and the resistor string 172 may provide voltages 176 at steps of approximately 10 mV to 50 mV. Thus, in such an embodiment, $V_{COM}$ may be adjusted at a resolution of between approximately 10 mV to 50 mV by the circuit 134.

Figure 11:
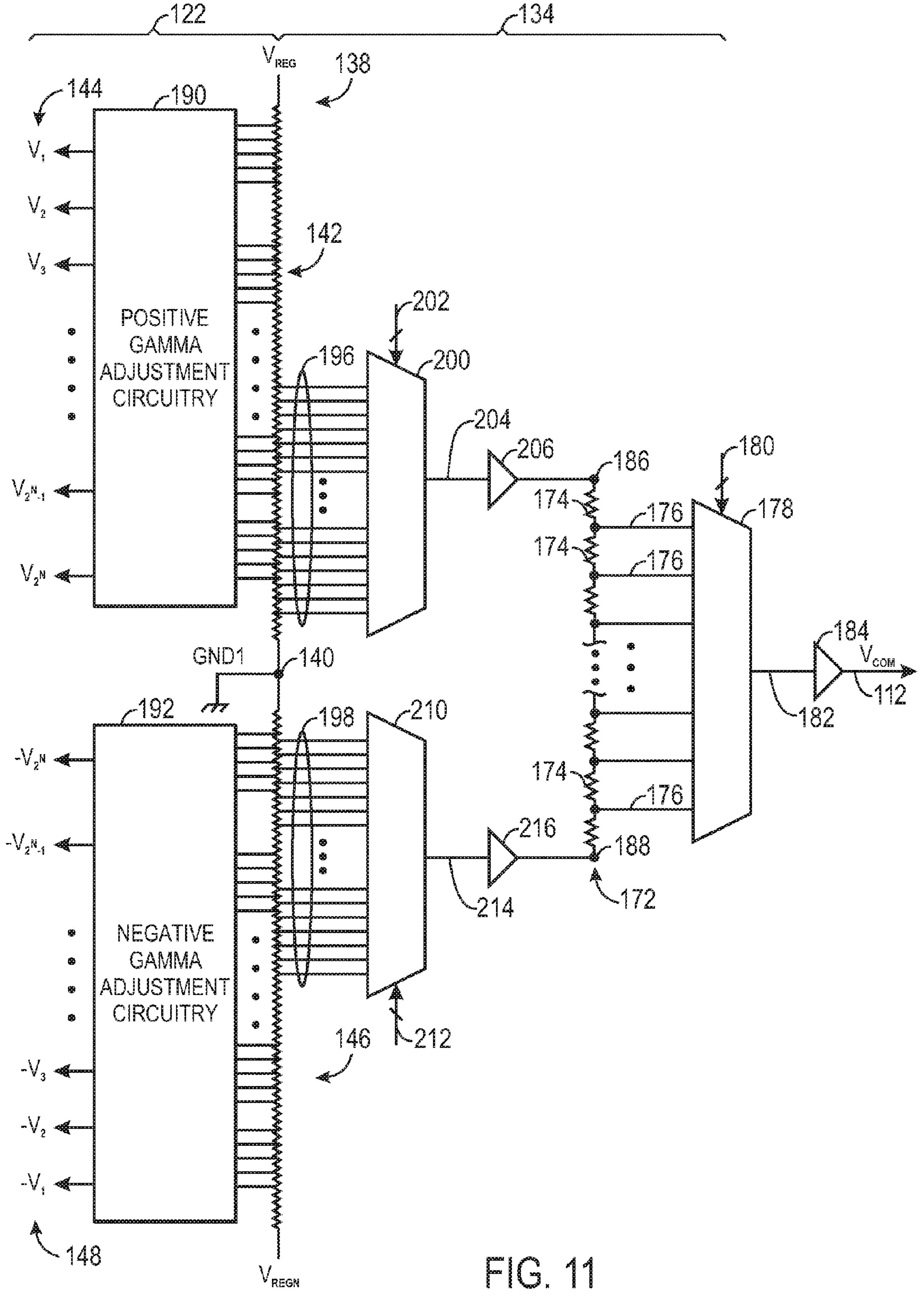
FIG. 11 is block diagram of a gamma adjustment circuit and a common voltage generation circuit that share a voltage reference point, in accordance with aspects of the present disclosure.

Referring now to FIG. 11, an embodiment in which the gamma adjustment circuitry 122 and the $V_{COM}$ generation circuitry 134 share a resistor string 138, such that each of the circuits 122 and 134 are coupled to a common reference (e.g., GND1), in accordance with aspects of the present disclosure. For simplicity, certain elements of the gamma adjustment circuitry 122 depicted FIG. 8 have been generalized by the blocks 190 and 192. For instance, the block 190 may represent the multiplexers 150, buffers 152, and resistor string 154 used to produce the positive gamma voltages 144, and the block 192 may represent the multiplexers 150, buffers 152, and resistor string 160 used to produce the negative gamma voltages 148.

In the illustrated embodiment, the positive and negative voltages supplied to the resistor string 172 of the $V_{COM}$ generation circuitry 134 are selected from the resistor string 138. Thus, the $V_{COM}$ generation circuitry 134 shares the resistor string 138 with the gamma adjustment circuitry 122, and also shares a common reference GND1 at node 140. Further, it should be noted that the resistor string 172 is not grounded to GND2 (at node 175) in FIG. 11, since the positive and negative values are determined from values selected from the resistor string 138.

As discussed above, the resistor string 138 may be a linear resistor string. A set of positive voltages 196 may be supplied from the positive side 142 of the resistor string 138 to a multiplexer 200. The multiplexer 200 selects one of the positive voltages 196 based upon a selection signal 202, and outputs the selected positive voltage 204. The selected positive voltage 204 is received by a buffer 206 and then provided to the upper end node 186 of the resistor string 172. That is, the selected positive voltage 204 effectively provides $V_{COM\_P}$ to the resistor string 172.

Similarly, a set of negative voltages 198 may be supplied from the negative side 146 of the resistor string 138 to a multiplexer 210. The multiplexer 210 selects one of the negative voltages 198 based upon a selection signal 212, and outputs the selected negative voltage 214. The selected negative voltage 214 is received by a buffer 216 and then provided to the lower end node 188 of the resistor string 172. That is, the selected negative voltage 214 effectively provides $V_{COM\_N}$ to the resistor string 172.

As will be appreciated, the selected voltages 204 and 214 may be lesser in magnitude relative to $V_{REG}$ and $V_{REGN}$, respectively. By way of example only, $V_{REG}$ and $V_{REGN}$ may be equal to approximately 4 volts and −4 volts, respectively, and the selected voltages 204 and 214 may be equal to approximately 2 volts and −2 volts, respectively. Depending on the selected values of the voltages 204 and 214, the resistor string 172 functions as a voltage divider to provide the voltages 176 to the multiplexer 178. The step size between each adjacent voltage 176 may be dependent upon the voltage difference between node 186 and node 188 and the resistance of each resistor 174. As discussed above, the resistor string 172 may be a linear resistor string in one embodiment, such that each resistor 174 has the same value. In one embodiment, the resistors 174 may be selected such that the step between each voltage 176 provided by the resistor string 172 is between approximately 0.05 to 0.25 mV or, more specifically, between approximately 0.10 to 0.15 mV.

As discussed above in FIG. 10, the voltages 176 are provided to a selection circuit, such as the multiplexer 178, which selects an appropriate voltage for $V_{COM}$ in response to the control signal 180. The selected $V_{COM}$ voltage 182 is provided to the buffer 184 before being transmitted to common electrodes 110 of the pixels 82 via the $V_{COM}$ line 112. As discussed above, by utilizing a common ground for the common voltage and the data voltages, variations in the data signals relative to the common voltage signals may cancel out with respect to each other. This may improve overall panel operation, voltage precision, and color accuracy in the display 12.

Further, in certain embodiments, the sharing of the resistor string 138 may reduce overall chip area and thus the size of the display circuitry for driving the display panel 80. Though not explicitly shown in FIG. 11, in one embodiment, the voltages 196 and 198 may be provided directly to the multiplexer 178 for the selection of a $V_{COM}$ value(s). In such an embodiment, the resolution at which $V_{COM}$ is selected may be based upon the voltage steps between each resistor (e.g., 162 of FIG. 10) in the resistor string 139. In this manner, overall chip area is reduced, since the resistor string 138 is common to both the $V_{COM}$ generation circuit 134 and the gamma adjustment circuit 122.

In the depicted embodiment, the resistor string 172 further provides for an even finer resolution for selecting $V_{COM}$. For instance, the resistor string 172 may divide the voltages 2044 and 214 selected from the resistor string 138 at a ratio to provide voltage steps (e.g., between approximately 0.10 to 0.15 mV or less) that are smaller between each resistor 174 compared to the voltage steps between the resistors 162 of the resistor string 138. As will be appreciated, although the presently illustrated embodiments utilizes the multiplexers 200 and 210 and the buffers 206 and 216, these components may still be selected and/or fabricated such that they generally occupy less chip area than providing a independent separate resistor string for the $V_{COM}$ values. As discussed above, this not only improves the resolution for adjusting and/or selecting $V_{COM}$ values, but may also reduce overall manufacturing costs by reducing chip area and hardware. Further, because the $V_{COM}$ circuitry 134 and the gamma adjustment circuitry 122 are tied to a common reference (e.g., GND1 at node 140), variations between these signals may be substantially reduced relative to each other. That is, the voltage difference between the pixel electrode (e.g., 92) and the common electrode (e.g., 110) of a pixel 82 that is used to generate an electrical field for modulating light transmission through a liquid crystal layer is subject to less variations, thus improving overall color accuracy in the displayed image.

The presently disclosed techniques may also be applied to display devices that utilize multiple common voltages. For instance, in some display devices, different common voltages may be supplied to certain pixels. By way of example, in display devices in which the capacitive elements forming the pixels also function as elements of a touch-sensing system, the multiple common voltages (e.g., a first common voltage $V_{COM1}$ and a second common voltage $V_{COM2}$) may be used to define discrete regions of pixels within a touchscreen. In one embodiment, the regions may be defined by breaks in the common voltage lines. For instance, $V_{COM1}$ and $V_{COM2}$ may be adjusted such that they have the same or different values. An example of a display that may provide for two or more common voltages that are adjustable in such a manner is generally disclosed in the commonly assigned U.S. Provisional Patent Application Ser. No. 61/316,210, entitled "Kickback Compensation Techniques," filed on Mar. 22, 2010, the entirety of which is hereby incorporated by reference for all purposes.

Figure 12:
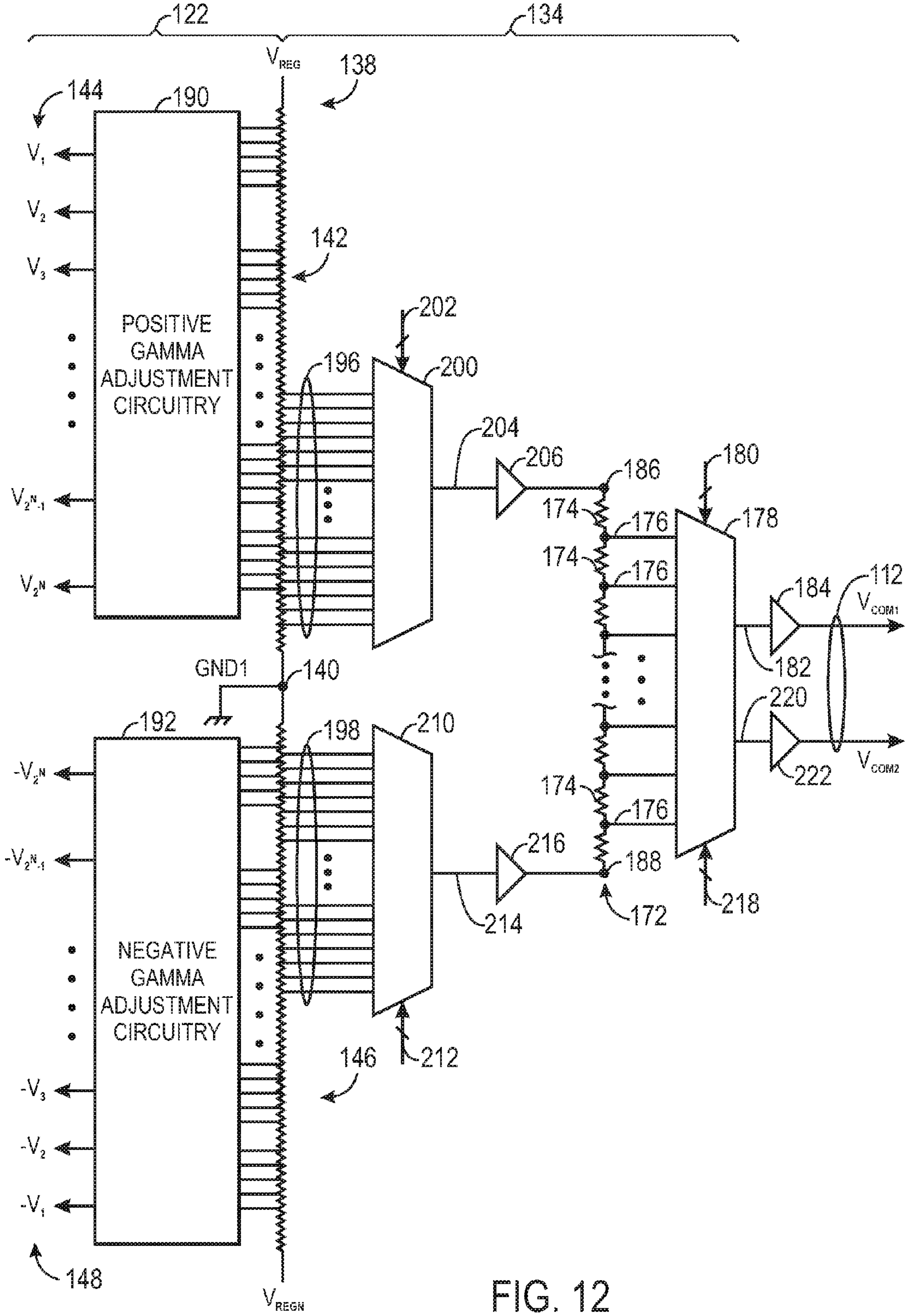
FIG. 12 is block diagram of the gamma adjustment circuit and the common voltage generation circuit, as shown in FIG. 11, but with the common voltage generation circuit being configured to generate multiple common voltage signals, in accordance with aspects of the present disclosure.

FIG. 12 shows an embodiment in which the circuitry of FIG. 11 is configured to provide multiple common voltages. Generally, the operation of the gamma adjustment circuitry 122 and the $V_{COM}$ generation circuitry 134 is identical (as described in FIG. 11), except that the multiplexer 178 may be a M-to-2 multiplexer (e.g., M being the number of voltage inputs 176) configured to select two values that represent $V_{COM1}$ and $V_{COM2}$. For instance, $V_{COM1}$, represented here by reference number 182, is selected based upon the control signal 180 and is provided to the buffer 184 before being transmitted to a first common voltage line. $V_{COM2}$, represented here by reference number 220, is selected based upon the control signal 218 and is provided to the buffer 222 before being transmitted to a second corresponding common voltage line. Thus, here the common voltage line 112 may actually represent a common voltage bus that includes the first common voltage line providing $V_{COM1}$ and the second common voltage line providing $V_{COM2}$.

Figure 13:
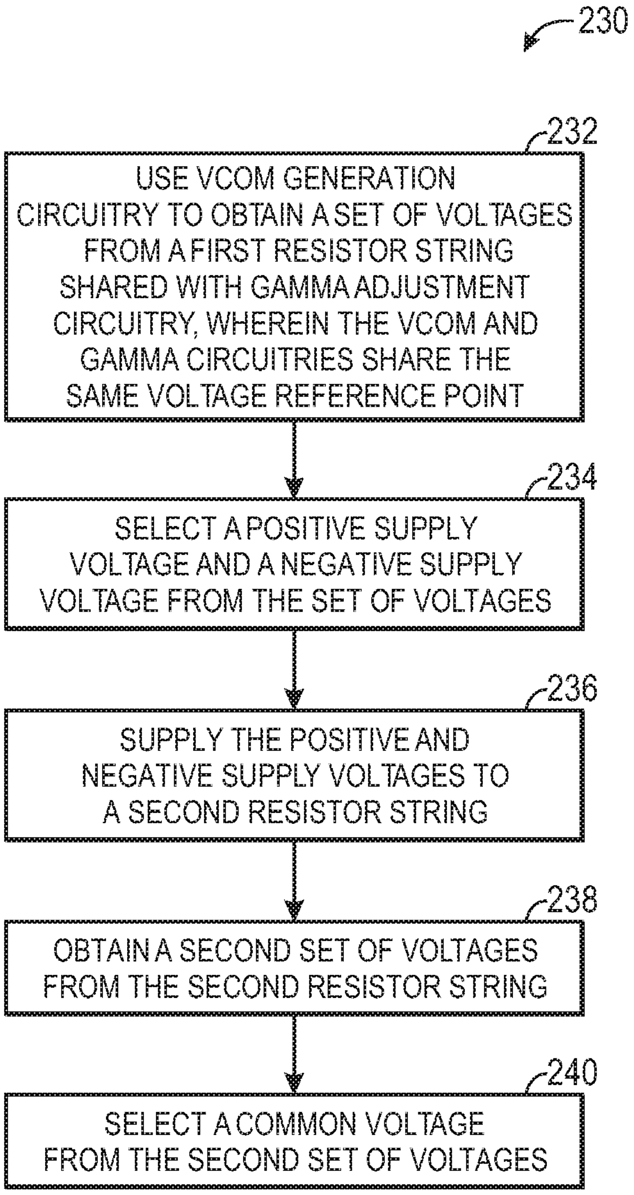
FIG. 13 is a flowchart depicting a method for generating a common voltage in a display device, in accordance with aspects of the present disclosure.

FIG. 13 is a flowchart depicting a method 230 for operating a display device in accordance with the techniques disclosed herein. At block 232, $V_{COM}$ generation circuitry 134 is used to obtain a set of voltages (e.g., 196 and 198) from a resistor string 138 that is shared with gamma adjustment circuitry 122, whereby the $V_{COM}$ generation circuitry 134 and gamma adjustment circuitry 122 share a voltage reference point. At block 234, positive and negative supply voltages are selected from the set of voltages obtained at block 232. Thereafter, at block 236, the positive and negative supply voltages are supplied to the resistor string 172 of the $V_{COM}$ generation circuit 134. Next, at block 238, a second set of voltages (e.g., 176), which may be obtained via voltage division along the resistor string 172, is obtained and provided to the selection circuit

178. At block 240, the selection circuit 178 selects a common voltage value from the second set of voltages (e.g., 176) in response to a control signal 180.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. A system comprising:

a liquid crystal display (LCD) panel comprising a pixel array having a plurality of unit pixels, wherein the plurality of unit pixels comprises a first set of unit pixels each having a pixel electrode forming a capacitive element with a first common electrode;

a gamma adjustment logic configured to convert digital image data into a corresponding analog voltage signal;

a common voltage generation circuit configured to provide a first common voltage signal to a first common voltage line coupled to the first common electrode; and a first resistor string configured to provide a first set of voltages to the gamma adjustment logic and a second set of voltages to the common voltage generation circuit, wherein the first resistor string comprises:

a grounding point that provides a shared voltage reference for each of the gamma adjustment logic and the common voltage generation circuit;

a first set of resistors coupled between the grounding point and a positive voltage source and defining a positive side of the first resistor string, wherein the positive side of the first resistor string is configured to provide positive voltages; and a second set of resistors coupled between the grounding point and a negative voltage source and defining a negative side of the first resistor string, wherein the negative side of the first resistor string is configured to provide negative voltages;

wherein the common voltage generation circuit comprises a second resistor string having first and second end nodes, wherein a first end node receives a positive voltage selected from the positive side of the first resistor string, and wherein the second end node receives a negative voltage selected from the negative side of the first resistor string.

2. The system of claim 1, comprising a source driver circuit, wherein the corresponding analog voltage signal is provided to a corresponding one of the plurality of unit pixels by way of a source line coupled to the source driver circuit.

3. The system of claim 1, wherein the gamma adjustment logic comprises a third resistor string and a fourth resistor string;

wherein the positive side of the first resistor string is configured to provide a set of positive adjustment voltages to the third resistor string, and wherein the third resistor string is configured to provide a set of positive data voltages based upon the set of positive adjustment voltages; and wherein the negative side of the first resistor string is configured to provide a set of negative adjustment voltages to the fourth resistor string, and wherein the fourth resistor string is configured to provide a set of negative data voltages based upon the set of negative adjustment voltages.

4. The system of claim 1, wherein the positive side of the first resistor string provides a set of positive voltages to a first multiplexer configured to select the positive voltage from the set of positive voltages in response to a first control signal; and wherein the negative side of the first resistor string provides a set of negative voltages to a second multiplexer configured to select the negative voltage from the set of negative voltages in response to a second control signal.

5. The system of claim 4, wherein the second resistor string is configured to provide a set of voltage inputs to a third multiplexer, wherein the third multiplexer is configured to select the first common voltage signal from the set of voltage inputs in response to a third control signal.

6. The system of claim 5, wherein the plurality of unit pixels comprises a second set of unit pixels each having a pixel electrode forming a capacitive element with a second common electrode.

7. The system of claim 6, wherein the third multiplexer is configured to select a second common voltage signal from the set of voltage inputs in response to a fourth control signal, and wherein the second common voltage signal is provided to the second common electrode.

8. A method for operating a display device comprising:

providing a first set of voltages and a second set of voltages from a first resistor string having an intermediate node coupled to ground between a positive voltage source and a negative voltage source;

using gamma adjustment circuitry to generate a corresponding set of data voltage values based upon the first set of voltages; and using a common voltage generation circuit to select a positive supply voltage and a negative supply voltage from the second set of voltages, supply the positive supply voltage and the negative supply voltage to first and second end nodes, respectively, of a second resistor string, supply a third set of voltages from the second resistor string to a first selection circuit, and use the first selection circuit to select a first common voltage from the third set of voltages;

wherein the grounded intermediate node is shared between the gamma adjustment circuitry and the common voltage generation circuit.

9. The method of claim 8, wherein the set of data voltage values generated by the gamma adjustment circuitry comprises positive data voltage values and negative data voltage values.

10. The method of claim 8, comprising providing the first common voltage to a first common voltage line coupled to a first common electrode associated with a first set of pixels of the display device.

11. The method of claim 8, comprising using the selection circuit to select a second common voltage from the third set of voltages and providing the second common voltage.

12. The method of claim 11, comprising providing the second common voltage to a second common voltage electrode line coupled to a second common electrode associated with a second set of pixels of the display device.

13. The method of claim 8, wherein selecting the positive supply voltage and the negative supply voltage from the second set of voltages comprises:

using a second selection circuit to select the positive supply voltage from the second set of voltages in response to a first control signal; and using a third selection circuit to select the negative supply voltage from the second set of voltages in response to a second control signal.

14. A source driver integrated circuit (IC) comprising:

a first resistor string comprising an intermediate grounding point, a first plurality of resistors connected in series between the intermediate grounding point and a positive voltage source, and a second plurality of resistors coupled in series between the intermediate grounding point and a negative voltage source, wherein the first plurality of resistors provides positive voltages and the second plurality of resistors provides negative voltages;

a common voltage generation circuit configured to receive a first set of positive and negative voltages from the first resistor string and provide a first common voltage and a second common voltage to a first common voltage line and a second common voltage line; and gamma adjustment logic configured to receive a second set of positive and negative voltages from the first resistor string and convert digital image data received by the source driver IC into a corresponding analog voltage signal.

15. The source driver IC of claim 14, wherein the common voltage generation circuit comprises:

a first multiplexer configured to receive positive voltages from the first set of positive and negative voltages and to select a positive supply voltage value;

a second multiplexer configured to receive negative voltages from the first set of positive and negative voltages and to select a negative supply voltage value;

a second resistor string comprising a plurality of resistors arranged between a first node and a second node, wherein the first node receives the positive supply voltage value and the second node receives the negative supply voltage value, wherein the second resistor string is configured to provide a set of common voltage values; and a third multiplexer configured to select the first common voltage and the second common voltage from the set of common voltage values.

16. The source driver IC of claim 15, wherein the second resistor string is a linear resistor string.

17. The source driver IC of claim 15, wherein each of the plurality of resistors of the second resistor string provides for a voltage drop of between approximately 0.05 to 0.25 millivolts (mV).

18. The source driver IC of claim 14, wherein the positive voltage source has a value of between approximately 4 to 5 volts, and wherein the negative voltage source has a value of between approximately −4 to −5 volts.

19. An electronic device, comprising:

one or more input structures;

a storage structure encoding one or more executable routines;

a processor capable of receiving inputs from the one or more input structures and of executing the one or more executable routines when loaded in a memory; and a display device configured to display an output of the processor, wherein the display device comprises:

a liquid crystal display panel comprising a plurality of unit pixels including a first unit pixel associated with a first common voltage and a second unit pixel associated with a second common voltage; and a source driver integrated circuit (IC) comprising:

a first resistor string comprising a center grounding point, a first end node configured to receive a positive voltage supply, and a second end node configured to receive a negative voltage supply;

a common voltage generation circuit coupled to the first resistor string and configured to receive a first set of voltages from the first resistor string and to determine a first common voltage and a second common voltage; and gamma adjustment logic coupled to the first resistor string and configured to receive a second set of voltages from the first resistor string and convert digital image data received by the source driver IC into a corresponding analog voltage signals;

wherein the first unit pixel and the second unit pixel are coupled to respective first and second common voltage lines, and wherein the common voltage generation circuit provides the first common voltage to the first common voltage line and the second common voltage to the second common voltage line.

20. The electronic device of claim 19, wherein the gamma adjustment logic and the common voltage generation circuit are each configured to generate signals using the center grounding point of the first resistor string as a shared voltage reference point.

21. The electronic device of claim 19, wherein the source driver IC is configured to drive the liquid crystal display panel using at least one of an line inversion, column inversion, or dot inversion driving technique.

22. The electronic device of claim 19, comprising a laptop computer, a desktop computer, a portable media player, a mobile phone, a tablet computing device, or some combination thereof.

23. A method for operating a display device comprising:

sharing a first resistor string between a gamma adjustment circuit and a common voltage generation circuit, wherein the first resistor string comprises:

a first set of resistors coupled between a grounding point and a positive voltage source and defining a positive side of the first resistor string, wherein the positive side of the first resistor string is configured to provide positive voltages; and a second set of resistors coupled between the grounding point and a negative voltage source and defining a negative side of the first resistor string, wherein the negative side of the first resistor string is configured to provide negative voltages;

using the first set of resistors and the second set of resistors to determine a common voltage; and providing the common voltage to a common electrode associated with the pixel electrode.

24. The method of claim 23, wherein using the first set of resistors and the second set of resistors to determine the common voltage comprises:

providing a positive voltage from the first set of resistors to a first end node of a second resistor string, wherein the second resistor string is part of the common voltage generation circuit; and providing a negative voltage from the second set of resistors to a second end node of the second resistor string; and selecting the common voltage from a node disposed on the second resistor string.

* * * * *